United States Patent [19]

Terrell

[11] Patent Number: 5,146,959
[45] Date of Patent: Sep. 15, 1992

[54] POWER PLANE SUPPORT APPARATUS

[76] Inventor: Noel E. Terrell, 1713 McArthur, Colorado Springs, Colo. 80909

[21] Appl. No.: 790,820

[22] Filed: Nov. 12, 1991

[51] Int. Cl.⁵ .......................... B27C 9/02; B27C 5/10
[52] U.S. Cl. ..................................... 144/1 F; 30/475; 409/178
[58] Field of Search ............ 144/1 R, 1 E, 1 F, 117 C; 30/373, 475, 477; 83/574; 409/175, 178

[56] References Cited

U.S. PATENT DOCUMENTS

| | | | |
|---|---|---|---|
| 2,491,106 | 12/1949 | Grasser | 30/475 |
| 2,676,624 | 4/1954 | Gecmen | 30/476 |
| 2,805,696 | 9/1957 | Thompson | 30/475 |
| 5,063,979 | 11/1991 | Johnson | 144/1 F |
| 5,066,177 | 11/1991 | Brown, Jr. | 30/475 |

Primary Examiner—W. Donald Bray
Attorney, Agent, or Firm—Leon Gilden

[57] ABSTRACT

A power plane is mounted between opposed side plates and positioned upon respective first and second support plates that are in turn secured to interior surfaces of the side plates in confronting relationship to position and orient the plane structure relative to a workpiece top surface. A modification of the invention includes the plane structure arranged for pivotment to provide angular adjustment of the power plane relative to the workpiece.

3 Claims, 5 Drawing Sheets

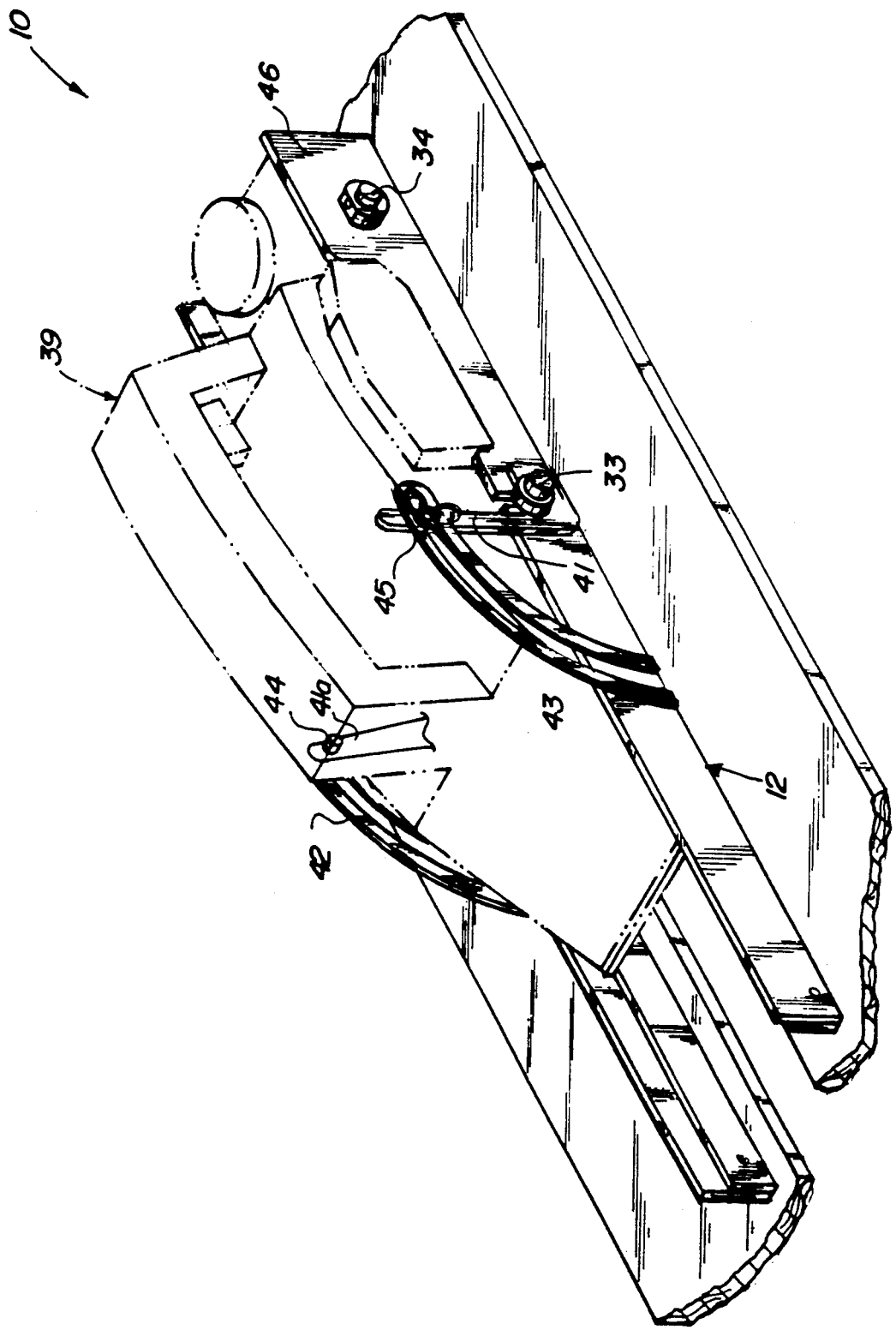

POWER PLANE SUPPORT APPARATUS

BACKGROUND OF THE INVENTION

1. Field of the Invention

The field of invention relates to woodworking apparatus, and more particularly pertains to a new and improved power plane support apparatus wherein the same is arranged to properly orient a power plane relative to a workpiece.

2. Description of the Prior Art

Various fences and types are utilized in woodworking for positioning a tool relative to a workpiece. Such apparatus is exemplified in U.S. Pat. No. 4,867,425 to Miraglia, Jr. wherein a guide fence for hand-held power saws is provided to set forth a desired and adjustable abutment surface relative to a power saw structure.

U.S. Pat. No. 3,869,951 to Litwin and U.S. Pat. No. 4,777,726 to Flowers are further examples of power saw guide apparatus.

As such, it may be appreciated that there continues to be a need for a new and improved power plane support apparatus as set forth by the instant invention which addresses both the problems of ease of use as well as effectiveness in construction in the orientation of a motor-driven plane relative to a workpiece and in this respect, the present invention substantially fulfills this need.

SUMMARY OF THE INVENTION

In view of the foregoing disadvantages inherent in the known types of power plane apparatus now present in the prior art, the present invention provides a power plane support apparatus wherein the same is arranged to position and mount a power plane for sliding relationship relative to a top surface or a workpiece to be planed. As such, the general purpose of the present invention, which will be described subsequently in greater detail, is to provide a new and improved power plane support apparatus which has all the advantages of the prior art power plane apparatus and none of the disadvantages.

To attain this, the present invention provides a power plane mounted between opposed side plates and positioned upon respective first and second support plates that are in turn secured to interior surfaces of the side plates in confronting relationship to position and orient the plane structure relative to a workpiece top surface. A modification of the invention includes the plane structure arranged for pivotment to provide angular adjustment of the power plane relative to the workpiece.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved power plane support apparatus which has all the advantages of the prior art power plane apparatus and none of the disadvantages.

It is another object of the present invention to provide a new and improved power plane support apparatus which may be easily and efficiently manufactured and marketed.

It is a further object of the present invention to provide a new and improved power plane support apparatus which is of a durable and reliable construction.

An even further object of the present invention is to provide a new and improved power plane support apparatus which is susceptible of a low cost of manufacture with regard to both materials and labor, and which accordingly is then susceptible of low prices of sale to the consuming public, thereby making such power plane support apparatus economically available to the buying public.

Still yet another object of the present invention is to provide a new and improved power plane support apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 15 is an isometric illustration of a modification of the invention.

DESCRIPTION OF THE PREFERRED EMBODIMENT

Figure 1:
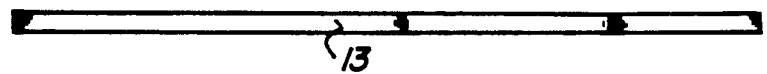
FIG. 1 is an orthographic bottom view of a side plate, as utilized by the invention.
Figure 2:
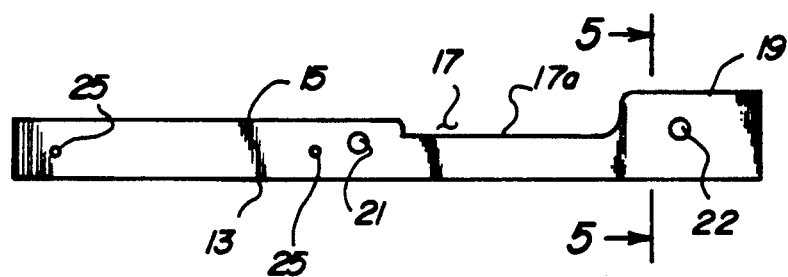
FIG. 2 is an orthographic side view of the side plate utilized by the invention.
Figure 3:
FIG. 3 is an orthographic bottom view of a support plate as utilized by the invention.
Figure 4:
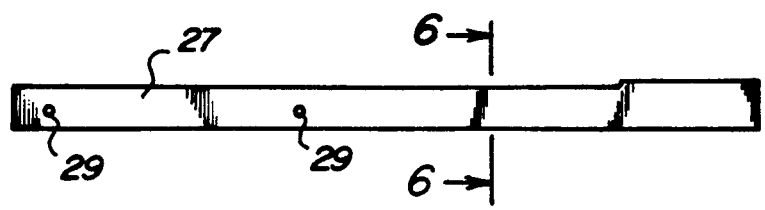
FIG. 4 is an orthographic side view of the support plate structure utilized by the invention.
Figure 5:
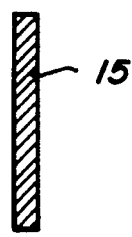
FIG. 5 is an orthographic view, taken along the lines 5—5 of FIG. 2 in the direction indicated by the arrows.
Figure 6:
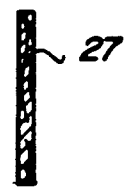
FIG. 6 is an orthographic view, taken along the lines 6—6 of FIG. 4 in the direction indicated by the arrows.
Figure 7:
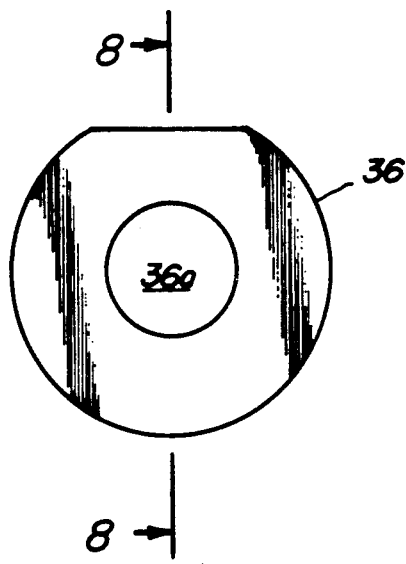
FIG. 7 is an orthographic end view of a lock cylinder utilized by the invention.
Figure 8:
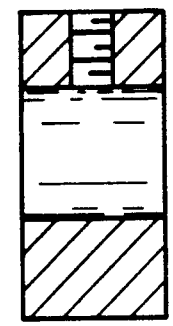
FIG. 8 is an orthographic view, taken along the lines 8—8 of FIG. 7 in the direction indicated by the arrows.
Figure 9:
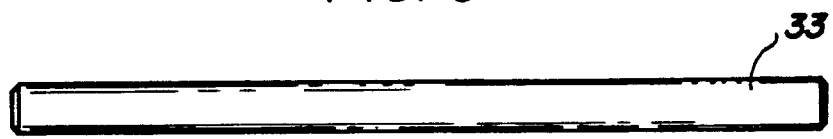
FIG. 9 is an orthographic side view of a rod structure utilized by the invention.
Figure 10:
FIG. 10 is an orthographic end view of the rod structure set forth in FIG. 9.
Figure 11:
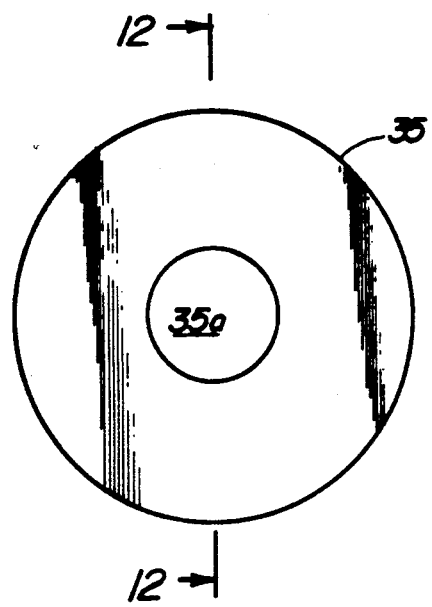
FIG. 11 is an orthographic side view of a further example of a clamp cylinder as utilized by the invention.
Figure 12:
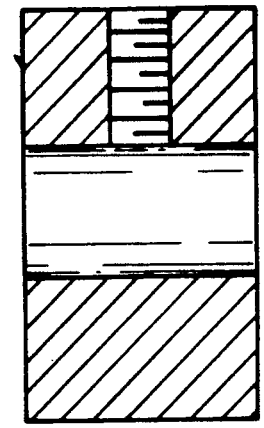
FIG. 12 is an orthographic view, taken along the lines 12—12 of FIG. 11 in the direction indicated by the arrows.
Figure 13:
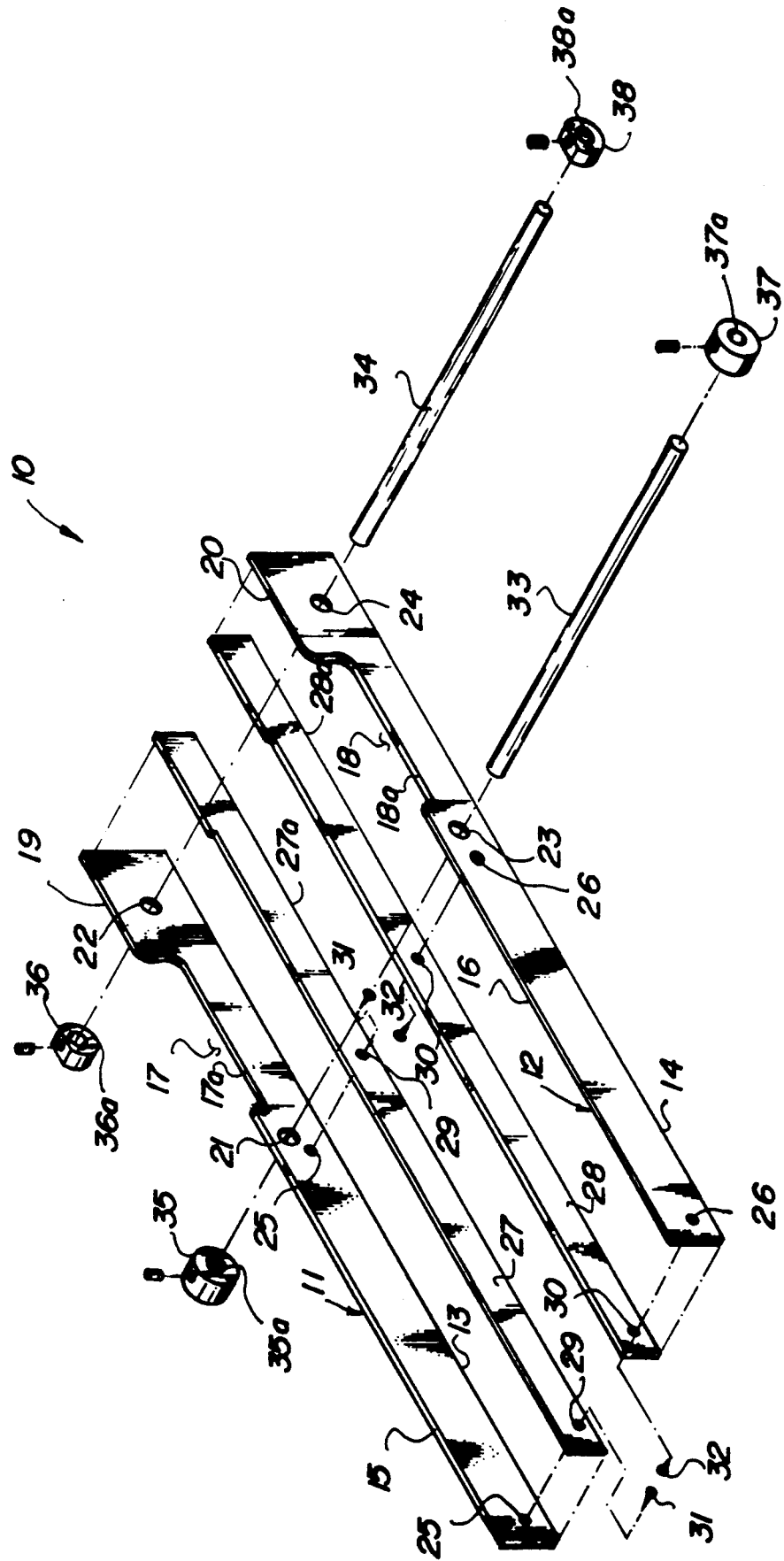
FIG. 13 is an isometric illustration of the support structure in exploded illustration.

With reference now to the drawings, and in particular to FIGS. 1 to 15 thereof, a new and improved power plane support apparatus embodying the principles and concepts of the present invention and generally designated by the reference numerals 10 and 10a will be described.

Figure 14:
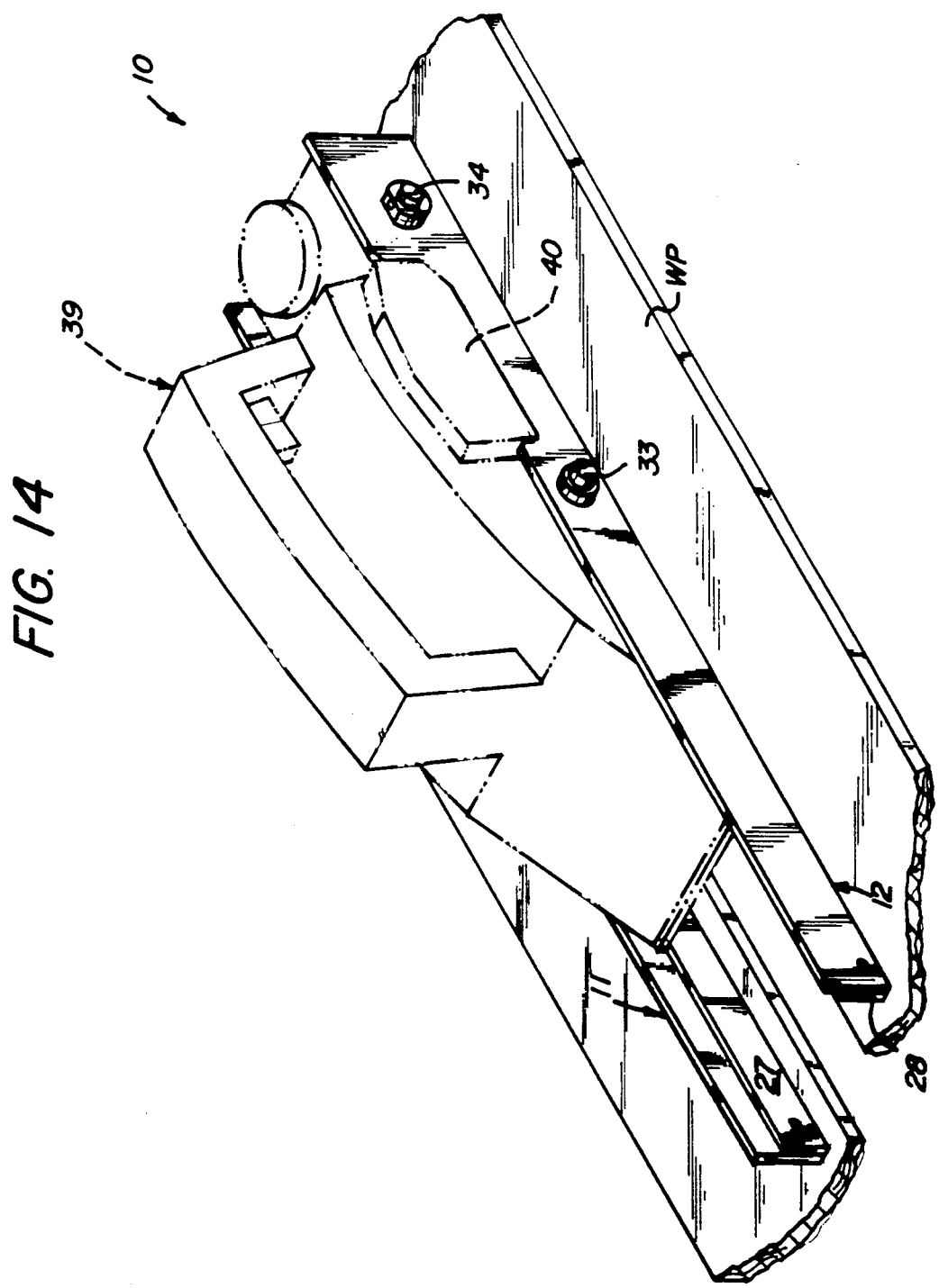
FIG. 14 is an isometric illustration of the invention in use.

More specifically, the power plane support apparatus 10 of the instant invention essentially comprises a first side plate 11 that is arranged as a mirror image configuration of a second side plate 12, wherein the first and second side plates are in a parallel coextensive relationship relative to one another. The first and second side plates include respective first and second planar bottom surface 13 and 14 that are coplanar relative to one another for sliding relationship relative to a workpiece "WP", such as illustrated in FIG. 14. First and second forward top edges 15 and 16 are formed to the side plates extending rearwardly to merge into respective first and second top edge recesses 17 and 18 that are in turn formed with respective first and second floors 17a and 18a. The first and second floors are coplanar relative to one another and each spaced above the respective first and second bottom surfaces 13 and 14 a predetermined height substantially to accommodate a power plane housing abutment 40 of a respective power plane 39, such as illustrated in the FIGS. 14 and 15. The recesses 17 and 18 of the first and second side plates have oriented rearwardly thereof respective first and second rear top edges 19 and 20 oriented above the first and second forward top edges 15 and 16 to provide for enhanced clamping of a rear portion of the power plane rearwardly of the forward blades of an associated power plane structure. The first and second side plates include first plate first and second bores 21 and 22 that are each in turn coaxially aligned with the respective second plate first and second bore 23 and 24. More specifically, the coaxially aligned first plate first bore 21 and the second plate first bore 23 receive a first rod therethrough, wherein the first plate second bore 22 and the second plate second bore 24 receive a second rod 34 therethrough as the rods 33 and 34 are arranged in a parallel relationship clamping the power plane 39 therebetween as the first and second rods include respective first and second lock cylinders 35 and 36 mounted to the first and second rods exteriorly of the first side plate, wherein third and fourth lock cylinders 37 and 38 mounted exteriorly of the second side plate assist in clamping the power plane relative to the side plates as the power plane is positioned upon the top edges of the first and second support plates 27 and 28, as illustrated in FIG. 14 for example. The lock cylinders include respective first, second, third, and fourth bores 35a, 36a, 37a, and 38a of the respective first through fourth lock cylinders, wherein each of the bores include respective first through fourth fasteners directed through the bores of the respective lock cylinder in engagement with an associated rod to clamp the rod to simultaneously effect abutment with an exterior surface of a side plate to provide for clamping of the associated support rods in the securement of the associated power plane between the side plates.

The first and second support plates 27 and 28 each include respective support plate first and second bottom surfaces 27a and 28a that are coplanar with the first and second planar bottom surfaces 13 and 14. First bores 29 directed through the first support plate and second bores 30 directed through the second support plate include respective first and second fasteners 31 and 32 to mount the respective first and second side plates to the respective first and second support plates. In the apparatus as set forth in the FIG. 15, the first and second side plates each include side plate rear support 46 that receives the second rod 34 orthogonally therethrough, while the first rod 33 forms a pivot from the forward end of each rear side plate. Each rear side plate of the first and second side plates includes a respective first and second support leg 41a and 41 extending orthogonally upwardly of each respective side plate operating with a respective first and second arcuate track 42 and 43. The arcuate tracks extend from the upper terminal ends of the first and second side plate support legs downwardly to the associated side plates to permit the latching of a respective first and second support leg guide rod 44 and 45 that is directed through the respective first and second support leg and through an associated arcuate track 42 and 43 to permit clamping of the support leg relative to the arcuate track in providing desired pivotment of the power plane 39 to the apparatus thereby providing for adjustment of the power plane relative to the workpiece in a planing procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A power plane support apparatus, comprising, a side plate mounted parallel to, coextensive with and in a spaced relationship to a second side plate, the first side plate including a first side plate bottom surface, the second side plate including a second side plate bottom surface, wherein the first bottom surface is coplanar with the second bottom surface, and the first side plate including a first forward top edge, the second side plate including a second forward top edge, and the first plate including a first top edge recess defined by a floor positioned below the first forward top edge, and the second side plate including a second top edge recess positioned rearwardly of the second forward top edge and including a second top edge recess floor coplanar with the first top edge recess floor and below the second forward top edge, and the first side plate further including a first rear top edge spaced above the first top edge recess floor and the second side plate including a second rear top edge spaced above the second top edge recess floor, and the first side plate including a first plate first bore spaced from a first plate second bore, the second side plate including a second plate first bore spaced from a second plate second bore, and the first plate first bore and the second plate first bore are coaxially aligned, and the first plate second bore and the second plate second bore are coaxially aligned, and a first rod directed through the first plate first bore and the second plate first bore, with a second rod directed through the second plate second bore and the first plate second bore, the first rod arranged parallel to the second rod, and including a power plane clampingly mounted between the first side plate and the second side plate, and a first support plate mounted to an interior surface of the first side plate, and a second support plate mounted to an interior surface of the second side plate, wherein the first support plate and the second support plate are in confronting relationship relative to one another, wherein the first support plate includes a first support plate top edge and the second support plate includes a second support plate top edge, wherein the first support plate top edge and the second support plate top edge are coplanar and positioned below the first top edge recess floor and the second top edge recess floor, wherein the first support plate top edge and the second support plate top edge mount the power plate thereon.

2. An apparatus as set forth in claim 1, wherein the first rod includes a first lock cylinder and a third lock cylinder mounted exteriorly of the first side plate and the second side plate and the second rod includes a second lock cylinder and a fourth lock cylinder mounted exteriorly of the first side plate and the second side plate respectively to secure the first side plate and second side plate in abutment to opposed sides of the power plane.

3. An apparatus as set forth in claim 2, wherein the side first side plate and the second side plate include a respective first side plate rear support and a second side plate rear support, the first side plate rear support and second side plate rear support each including the top edge recess and the second top edge recess respectively, and the first side plate rear support and the second side plate rear support receive the first rod orthogonally therethrough, wherein the first side rear support and the second side plate rear support are pivotally mounted about the first rod, and the first side plate rear support and the second side plate rear support include a respective first side plate support leg and a second side plate support leg extending upwardly and orthogonally relative to the respective first support plate and the second support plate respectively, and the first side plate support leg and the second side plate support leg include a respective first support leg guide rod and a second support leg guide respectively, and further including a first arcuate track receiving the first support leg guide rod and a second arcuate track support receiving a second support leg guide rod, the first arcuate track extends from the first support leg guide rod downwardly to the first side plate, and the second arcuate track extends downwardly from the second support leg guide rod to the second side plate to permit sliding guidance of the respective first support leg guide rod and the second support leg guide rod therethrough respectively.

* * * * *